United States Patent [19]
Krill

[11] 4,321,844
[45] Mar. 30, 1982

[54] BRAKE ADJUSTING TOOL
[75] Inventor: Peter P. Krill, Philadelphia, Pa.
[73] Assignee: Mrs. Peter P. Krill, Philadelphia, Pa.
[21] Appl. No.: 274,308
[22] Filed: Jun. 16, 1981
[51] Int. Cl.³ .................... B25B 27/00; F16D 65/46
[52] U.S. Cl. .................................. 81/3 R; 269/909
[58] Field of Search ................. 81/3 R; 29/270, 278; 269/900, 909; 188/79.5 GC, 196 M, 196 R, 79.5 R

[56] References Cited
U.S. PATENT DOCUMENTS 2,043,546  6/1936  Koenig ............................ 81/3 R
3,858,463  1/1975  Klavonich ...................... 81/3 R
4,190,931  3/1980  Del Bianco ..................... 81/3 R

*Primary Examiner*—Roscoe V. Parker
*Attorney, Agent, or Firm*—Frederick J. Olsson

[57] ABSTRACT

For use in connection with the adjusting spindle of a vehicle wheel brake of the kind wherein the adjusting spindle is accessible through at least one slot formed in the wheel hub, a tool adapted to be temporarily secured to the wheel hub and in such condition maintain the adjusting lever and star wheel out of engagement whereby both hands of the mechanic are free for turning the wheel and for adjusting the star wheel.

6 Claims, 5 Drawing Figures

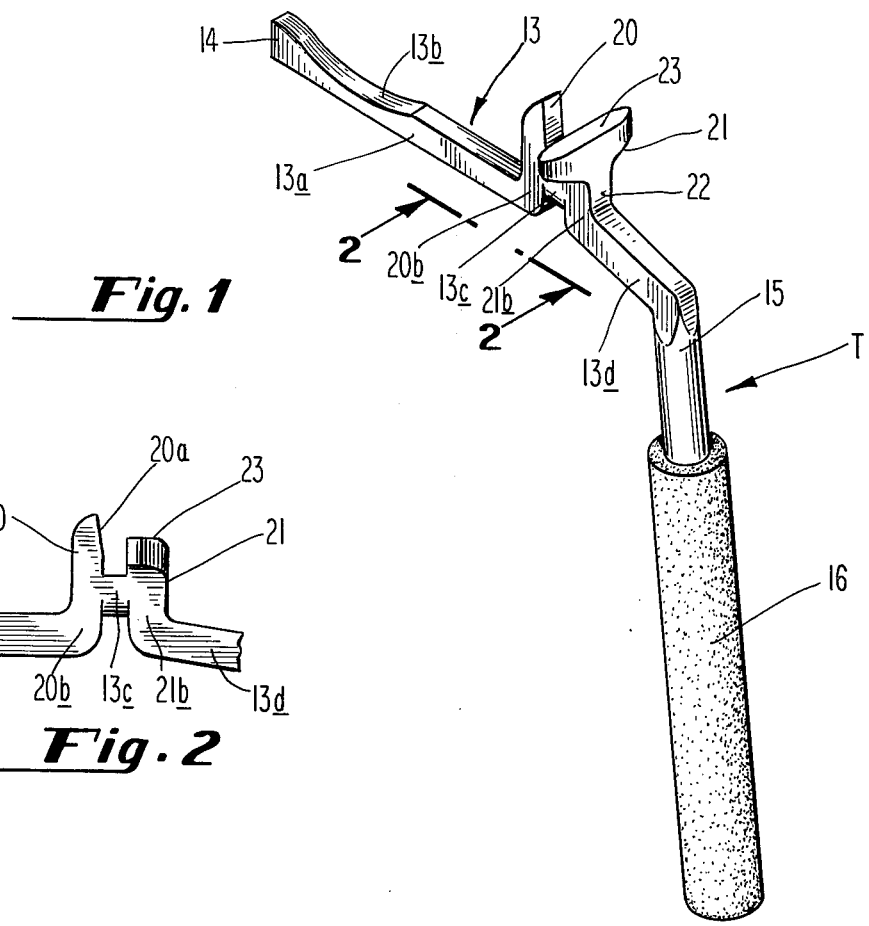
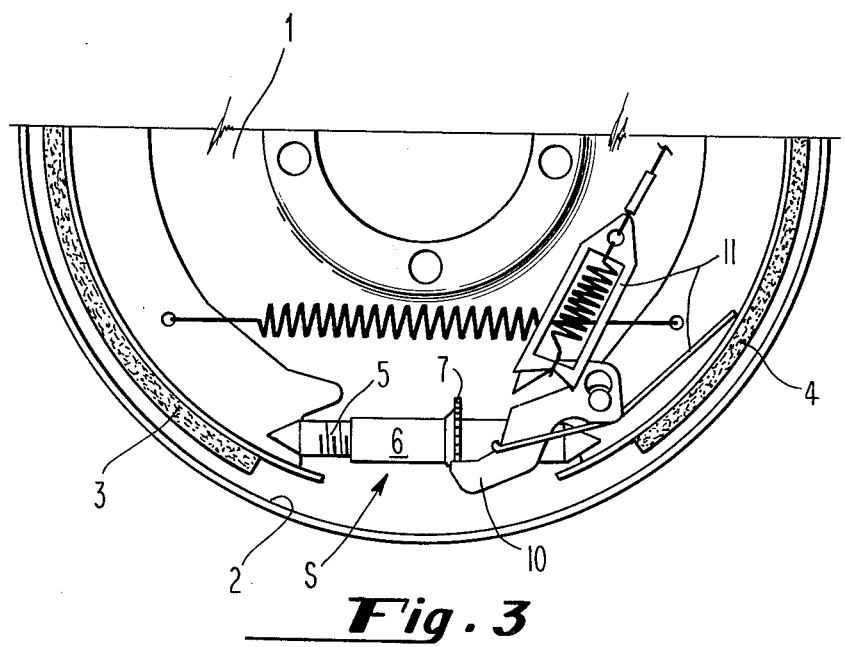

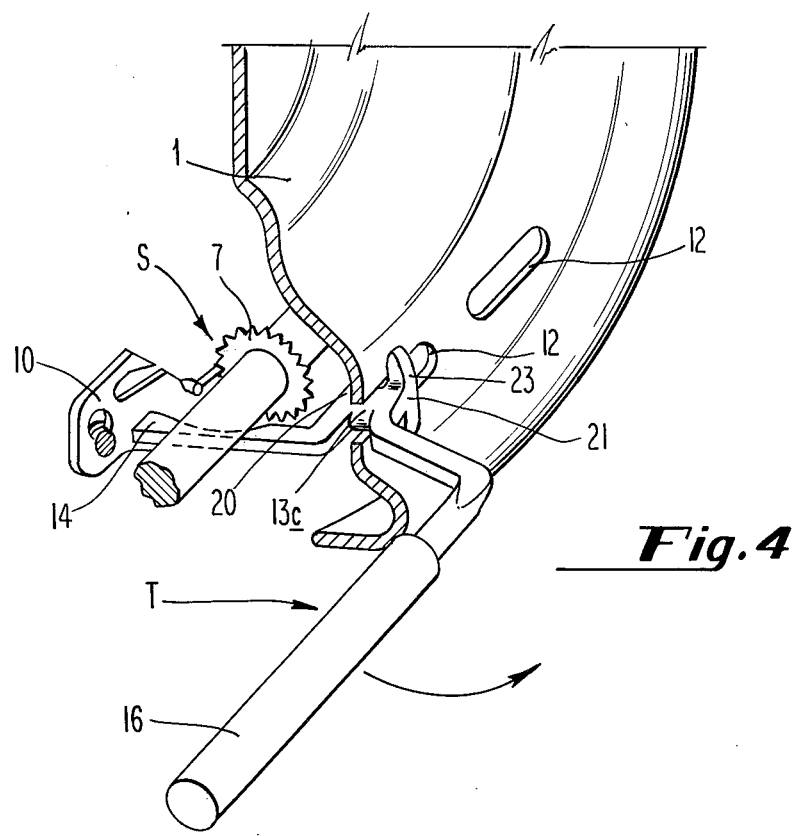
_Fig.4_
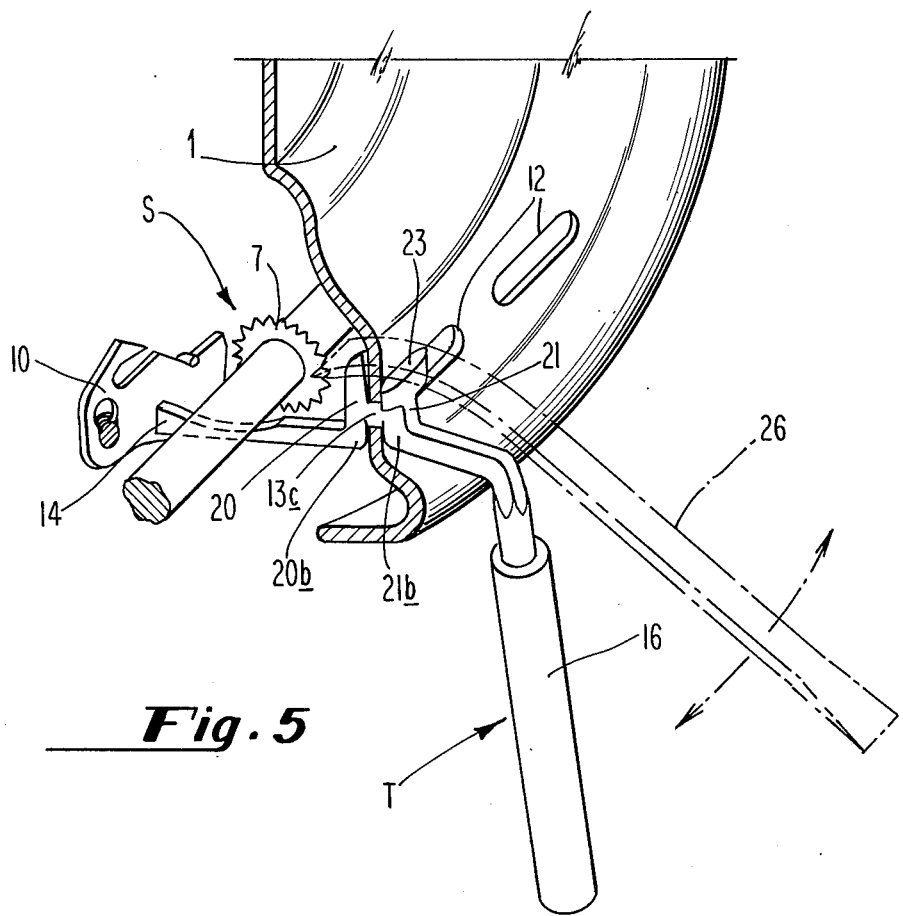
_Fig.5_

BRAKE ADJUSTING TOOL

This invention in general relates to hand tools for automotive mechanics and in particular relates to hand tools for use in adjusting vehicle brakes.

More particularly, the invention relates to tools for use with vehicles having drum/shoe type self-adjusting brakes wherein the shoes are adjusted relative to the drum by a star wheel controlled spindle, the star wheel being held fixed by being engaged with an adjusting lever which is spring biased toward the star wheel, the star wheel being rotatable (to adjust the brakes) when the adjusting lever is disengaged. In most vehicles having brakes of the kind in question, the drum, the shoes, the spindle, and the lever are behind the wheel hub with the lever and star wheel being accessible from the outside through a small slot in the hub.

In so far as I am aware, brakes of the kind in question are either improperly adjusted or correctly adjusted only by a tedious process which involves repeated picking up and laying down of a pair of tools.

Thus, conventionally, to make a proper adjustment, the mechanic takes a screw driver, inserts the same through the hub slot to contact and move the adjusting lever out of engagement with the star wheel. Then while holding this screw driver in one hand picks up another screw driver in the other hand, inserts through the slot to engage and move the star wheel. The screw drivers are then removed, put down, and the brake drum turned to check clearance. If not proper, the engaging and adjusting process with the screw drivers is repeated, the screw drivers again put down and the drum turned for checking. If not correct the routine is again repeated.

More often than not, the above-described time consuming and tedious process is abandoned in favor of a short cut which involves simply adjusting the shoes very tight and hoping that the consequent scratching of the drum will be minimal.

In view of the above, it will be apparent that there is need for a tool which conveniently permits the professional mechanic or the do-it-yourselfer to properly adjust the brakes. The tool of this invention fills that need.

According to the invention, the tool is structured to quickly disengage the adjusting lever and then be temporarily secured to the wheel hub so that both hands of the mechanic are free, one hand free to turn the wheel while at the same time the other hand is free to work a screw driver or other tool to adjust the star wheel in accordance with the turning characteristics and/or specifications.

The tool will be described below in connection with the following drawings wherein:

FIG. 1 is a perspective view of a preferred form of the tool of the invention;

FIG. 2 is a fragmentary view taken along the lines 2—2 of FIG. 1;

FIG. 3 is an elevational view of looking from the inside of a brake system and adjusting means of the kind in question;

FIG. 4 is a perspective view illustrating how the tool of the invention is manipulated to disengage the adjusting lever; and FIG. 5 is a perspective view illustrating how the tool of the invention is manipulated to maintain the star wheel disengaged and the tool secured to the wheel hub whereby both hands are free to operate a tool to move the star wheel.

Referring to FIG. 3, the parts of a conventional wheel and brake system of the kind in the invention are indicated as follows: the fixed wheel hub by 1; the rotatable brake drum by 2; the brake shoes by 3 and 4; the brake adjusting spindle S with its threads by 5, its nut by 6, and the star wheel thereon by 7; the adjusting lever by 10; and the spring means biasing the lever 10 into engagement with the star wheel by 11. Those skilled in the art will readily understand the details of structure and function of the foregoing conventional arrangement and further description is unnecessary.

As best noted in FIGS. 4 and 5, the hub is provided with one or more slots 12 which provide access to the adjusting spindle 5 from the outside.

It will be understood, of course, that as between manufacturers of brakes, manufacturers of brake systems, in different parts of the nation or by custom, the terminology of the above mentioned conventional parts may differ. Such difference in terminology, if any, however, will be readily understood by those skilled in the art.

Referring now to FIG. 1, the tool T has an elongated axially extending body 13. The body is dimensioned so that it can be moved through the hub slot 12.

On one end of the body is an operating head 14 which is also dimensioned so that it can be moved through the slot 12.

On the opposite end of the body is a handle 15. In this case, the handle is an extension of the body 12 and is oriented at substantially right angles and includes the hand grip 16.

A hold-out arm 20 extends radially outwardly from the body and is located on the body in position on the side of or adjacent to the head 14. The arm 20, like the body 13 and head 14, is dimensioned so that it can be moved through the slot 12.

A stop arm 21 extends radially outwardly from the body and is located on the body in a position between the arm 20 and the handle 15. The arm 21 is in the form of a T having a leg 22 and a top 23 which extends on either side of the leg.

With reference to FIGS. 1 and 2, it will be seen that the section 13a of the body has a top concave contour at 13b and that the section 13c between the arms 20 and 21 is offset from the section 13a and 13d of the body. Also, it will be noted that the arm 20 is tapered at 20a. The reasons for these structural conditions will be noted hereinafter.

The manner in which the above described tool is used will next be described.

First, the tool T is manipulated so as to disengage the adjusting lever from the star wheel. This is done by gripping the handle 16 and turning the tool so that the handle extends generally horizontally (FIG. 4) whereby the head 14 and hold-out arm 20 are in registry with slot 12. The tool is then moved axially with the head 14, the body 13, and the arm 20 passing through the slot 12 with the head 14 contacting and disengaging the adjusting lever 10. The inward motion is continued until the stop-arm 21 engages the outside of the hub 1. At this time the adjusting lever 10 is completely disengaged.

The tool is now turned 90° counterclockwise to the position of FIG. 5 and the axial pressure is relieved. The spring bias on the adjusting lever 10 pushes on the tool so that the hold-out arm engages the inside of the hub and the tool is temporarily secured in position. Both hands of the mechanic are now free.

At this point a screw driver or a special tool, such as the tool shown in phantom at 26 in FIG. 5, is taken in the right hand and inserted through the slot 12 and reciprocated to turn the star wheel. Then the tool 26 is slightly backed away from the star wheel and with the left hand, the drum turned and clearance checked. If not proper, the tool 26 is pushed in to again adjust the star wheel. The process is continued until the proper adjustment is obtained.

After the proper adjustment has been effected, the tool is turned clockwise 90° to the position as shown in FIG. 4 and pulled out of the hub to permit the adjusting lever to re-engage the star wheel. Usually, the star wheel is turned one notch to insure engagement.

The simplicity of the above adjustment procedure as compared to conventional adjustment procedure will be readily apparent.

The reasons for the preferred structural shape of the tool will now be commented on.

The hand grip portion 16 of the handle 4 and the body 13 are oriented at substantially 90°. The 90° orientation is preferred because the hand grip is out of the way (FIG. 5) when the tool 26 is employed. It will be understood, however, that the handle may be oriented in line with the body.

The body 13 being concavely contoured at 13b provides ample clearance between the body and spindle for the body to be freely turned as between the insertion position of FIG. 4 and the locking position of FIG. 5.

The taper 20a on the arm 20 is utilized to provide ample clearance with the wheel hub 1 to initiate the above mentioned tool turning operation.

The offset condition of the portion 13c of the body provides an additional dimension for the arm 20 in the form of the portion 20b (FIG. 5) which is used for engaging the inside of the hub 1 and an additional dimension for the stop-arm 21 in the form of the portion 21b which engages the outside of the hub 1. The bottom part of the portion 13c is preferrably rounded. As will be apparent, the portion 13c functions as a hub for the turning operation.

The stop-arm 21 is preferably dimensioned and oriented so that in any rotational position of the tool with the arm 20 inside the hub, the stop-arm cannot be inserted through the slot 12. In the embodiment shown, the leg 22 and the head 23 function for the foregoing purpose.

Before closing, it is pointed out that those skilled in the art will understand that the exact shape of the body, the operating head, the handle, the hold-out arm, and stop-arm may be varied to accommodate the structure of a particular self-adjusting brake structure without departing from the spirit and scope of the appended claims.

I claim:
1. For use in connection with the adjusting spindle of a vehicle wheel brake of the kind wherein the adjusting spindle is accessible through at least one slot formed in the wheel hub, a tool adapted to be temporarily secured to the wheel hub and in such condition maintain the adjusting lever and star wheel out of engagement whereby both hands are free for turning the brake drum and for adjusting the star wheel, the tool comprising:

an elongated, axially extending body;
an operating head formed on one end of the body;
a manipulating head formed on the opposite end of the body;
a hold-out arm formed on the body adjacent to the head and extending radially outwardly from the body;
a stop arm formed on the body between the hold-out arm and the handle and extending radially outwardly from the body;
the head and the arms respectively being dimensioned to provide for the handle to be manipulated to orient the head and hold-out arm in registry with said hub slot and push the head and the hold-out arm through the hub slot to cause the head to engage the adjusting lever and disengage the lever from the star wheel and when the head and lever are so engaged for the stop arm to engage the outside of the wheel hub and thereby stop said pushing movement; and
the dimensions of the body between said arms providing that when the stop arm engages the outside of the hub as aforesaid, the handle may be manipulated to turn the body to rotate the hold-out arm out of registry with said slot and, thereafter when the axial pressure of the handle is relieved, the force of the spring bias on the adjusting lever can exert a force on the body in a direction opposite to first said direction to cause the hold-out arm to firmly engage the inside of the wheel hub to temporarily secure the tool in said position whereby both hands of the mechanic are free for turning the brake drum and adjusting the star wheel.

2. The tool of claim 1 wherein the top of the body between said head and said hold-out arm has a concave contour.

3. The tool of claim 1 wherein the section of the body between said arms is radially off-set from the adjacent portions of the body whereby to provide extra radial dimensions respectively for the hold-out arm and stop-arm.

4. The tool of claim 1 wherein said stop-arm has a cross sectional shape in the form of a T.

5. The tool of claim 1 wherein said hold-out arm is tapered.

6. The tool of claim 1 wherein said handle and said body are oriented substantially at 90°.

* * * * *